(12) United States Patent
Krah

(10) Patent No.: US 8,156,894 B1
(45) Date of Patent: Apr. 17, 2012

(54) DUAL PHASE BIRD FEEDER

(76) Inventor: Kensell Krah, Newcastle, ME (US)

( * ) Notice: Subject to any disclaimer, the term of this patent is extended or adjusted under 35 U.S.C. 154(b) by 0 days.

(21) Appl. No.: 12/891,564

(22) Filed: Sep. 27, 2010

(51) Int. Cl.
*A01K 39/00* (2006.01)

(52) U.S. Cl. ............ 119/52.2; 119/57.8; 119/72

(58) Field of Classification Search ......... 119/52.2, 119/52.4, 53.5, 54, 57.8, 72, 74, 75
See application file for complete search history.

(56) References Cited

U.S. PATENT DOCUMENTS

| | | | | |
|---|---|---|---|---|
| 5,062,390 | A * | 11/1991 | Bescherer et al. | 119/72 |
| 5,269,258 | A * | 12/1993 | Brown | 119/57.9 |
| 5,303,674 | A * | 4/1994 | Hyde, Jr. | 119/77 |
| 5,682,835 | A * | 11/1997 | Walter et al. | 119/57.8 |
| 6,012,414 | A * | 1/2000 | Klein | 119/72 |
| D490,192 | S * | 5/2004 | Markusen et al. | D30/124 |
| 7,234,418 | B2 * | 6/2007 | Fort et al. | 119/72 |
| 7,448,347 | B2 * | 11/2008 | Richmond | 119/72 |
| 7,600,487 | B2 * | 10/2009 | Stone et al. | 119/72 |
| 7,748,347 | B2 * | 7/2010 | Richmond | 119/72 |
| 7,861,671 | B2 * | 1/2011 | Carter et al. | 119/72 |
| 7,891,319 | B2 * | 2/2011 | Stone et al. | 119/72 |
| 7,946,249 | B2 * | 5/2011 | Colvin et al. | 119/78 |
| 8,011,323 | B2 * | 9/2011 | Vaughn et al. | 119/72 |
| 2006/0037546 | A1 * | 2/2006 | Jung et al. | 119/72 |
| 2006/0090707 | A1 * | 5/2006 | Donegan | 119/72 |
| 2008/0053375 | A1 * | 3/2008 | Jung et al. | 119/72 |
| 2009/0199777 | A1 * | 8/2009 | Webber | 119/74 |
| 2009/0320765 | A1 * | 12/2009 | Gauker et al. | 119/75 |
| 2010/0192866 | A1 * | 8/2010 | McMullen | 119/77 |
| 2010/0229801 | A1 * | 9/2010 | Stone et al. | 119/74 |
| 2010/0251967 | A1 * | 10/2010 | Mateer et al. | 119/77 |
| 2011/0011345 | A1 * | 1/2011 | LoRocco et al. | 119/72 |
| 2011/0073043 | A1 * | 3/2011 | Dault | 119/57.9 |
| 2011/0094449 | A1 * | 4/2011 | George | 119/61.1 |

* cited by examiner

*Primary Examiner* — Yvonne Abbott
(74) *Attorney, Agent, or Firm* — Gulf Coast IP

(57) ABSTRACT

A bird feeder configured to provide a liquid phase food and a gelatinous phase food to a plurality of birds. The bird feeder further includes a first storage compartment and a second storage compartment operbaly coupled each having an interior volume configured to store a liquid phase food. The first storage compartment further includes a plurality of apertures facilitating access to the liquid phase food stored therein. A gelatinous phase food assembly is further included and attached to the bird feeder proximate the first storage compartment. The gelatinous phase food assembly further includes four containers operable to store and dispense gelatinous phase food to a plurality of birds. The four containers are supported by an inner support ring and an outer support ring. A cover extends over the bird feeder functioning the protect the gelatinous food assembly from environmental elements.

14 Claims, 2 Drawing Sheets

DUAL PHASE BIRD FEEDER

FIELD OF THE INVENTION

The present invention relates to a wild animal feeder, more specifically but not by way of limitation a bird feeder configured to provide a plurality food in a plurality of different phases wherein at least one phase of food is provided to the birds is a substantially gelatinous material.

BACKGROUND

Millions of individuals provide structures, such as bird feeders, for birds and other animals that are configured to provide food for the animals. These structures are often located proximate a residence so as to attract a variety of birds for the purpose of viewing. Conventional bird feeders are configured to provide a food to a plurality of different birds. Typically, conventional bird feeders are configured to store and dispense bird seed or other granular type food wherein the bird feeder has at least one compartment accessible to the user to dispose the bird seed therein. The compartment of the bird feeder is often configured with an opening at the bottom of the compartment such that as the birds consume the food, gravitational forces will bias the food towards the opening.

Alternatively, other conventional bird feeders are configured to provide liquid food to bird species such as hummingbirds. These types of bird feeders consistent of at least one compartment operable to store a liquid wherein the compartment is accessible to birds via at least one opening wherein the opening is covered with a collapsible membrane that allows the bird to penetrate the opening with its beak and further function to retain the liquid therein.

One problem with conventional bird feeders is that conventional bird feeders lack the configuration to provide a generally gelatinous food substance to the birds. Conventional bird seed feeders cannot have disposed therein a subsequently gelatinous bird food as the gelatinous food will propagate the bottom of the feeder from the opening. Additionally, conventional bird feeders that are configured to provide a liquid phase food to birds have shown to be insufficient in delivering gelatinous phase food as the viscosity of the gelatinous phase food is too high for birds to extract from conventional liquid feeders that have a membrane over the opening that provides access to the storage compartment for the liquid phase food.

Accordingly, there is a need for a bird feeder that is configured to provide food for birds wherein the bird feeder is operable to provide food in a plurality of phases, more specifically but not by way of limitation, food in a substantially gelatinous phase.

SUMMARY OF THE INVENTION

It is the object of the present invention to provide a bird feeder that is configured to provide food to at least one bird wherein the food is provided in a plurality of phases.

Another object of the present invention is to provide a bird feeder operable to provide food to at least one bird wherein the bird feeder is configured to store and dispense food that is substantially gelatinous.

A further object of the present invention is to provide a bird feeder operably configured to provide a gelatinous phase food to at least one bird that further includes a plurality of compartments to store the gelatinous phase food.

Still another object of the present invention is to provide a bird feeder operably configured to provide a gelatinous phase food to at least one bird that further includes a means to protect the gelatinous phase food from its environmental surroundings.

Yet another object of the present invention is to provide a bird feeder operably configured to provide gelatinous phase food to at least one bird that wherein the plurality of storage compartments operable to store the gelatinous phase food are removable and can be operbaly connected to a conventional bird feeder.

An additional object of the present invention is to provide a bird feeder operable to provide a gelatinous phase food to at least one bird that further includes a storage compartment operable to store and dispense a liquid phase food.

Another object of the present invention is to provide a bird feeder operable to provide a gelatinous phase food that includes a means to suspend the bird feeder from a suitable support structure.

Still a further object of the present invention is to provide a bird feeder operable to provide a gelatinous phase food to at least one bird that is easy to refill.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
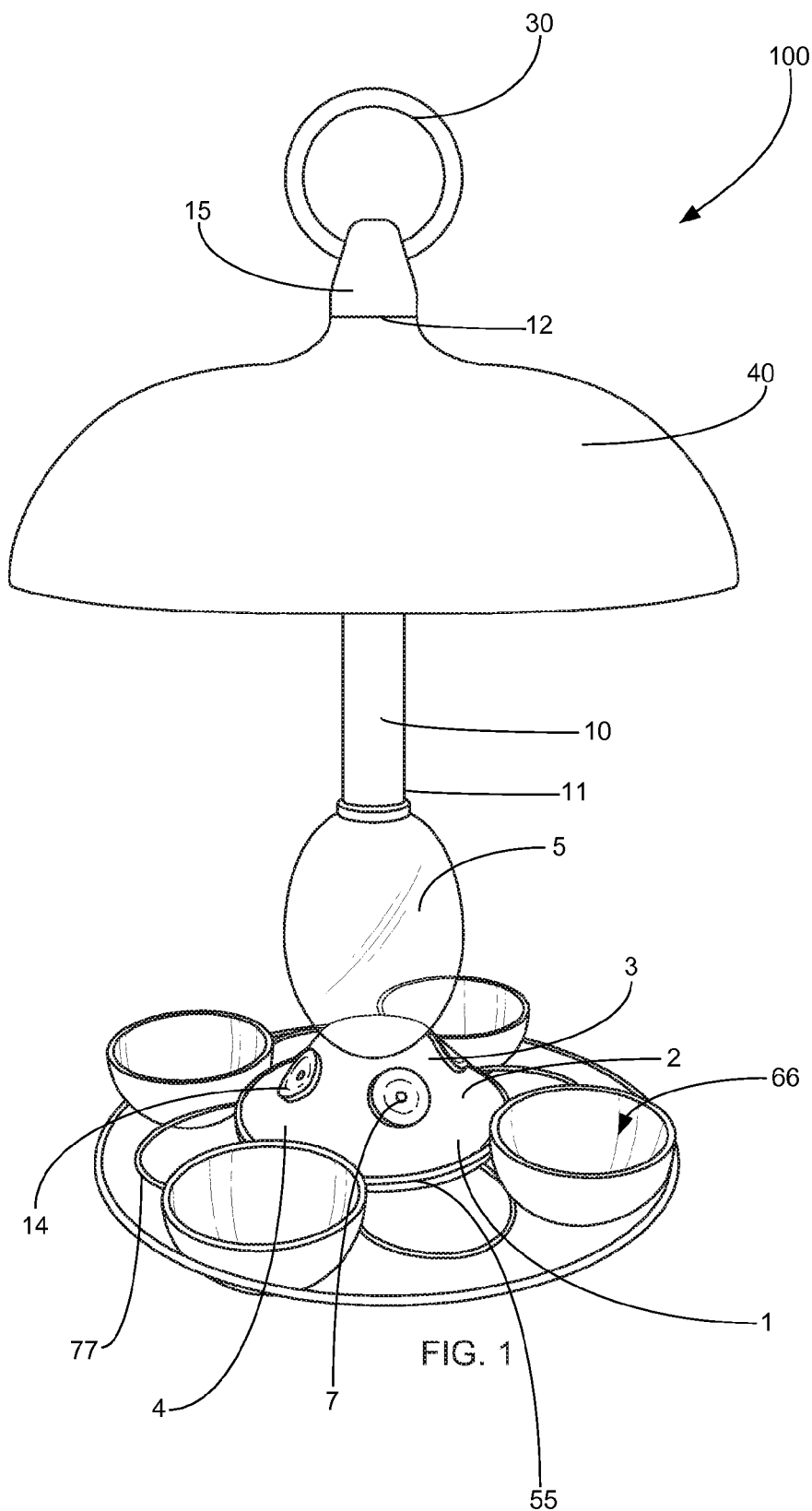
FIG. 1 is a perspective view of an embodiment of the present invention.

Referring now to the drawings submitted herewith, wherein various elements depicted therein are not necessarily drawn to scale and wherein through the views and figures like elements are referenced with identical reference numerals, there is illustrated a bird feeder 100 constructed according to the principles of the present invention.

Referring in particular to FIG. 1 the bird feeder 100 includes a base 2 that is generally modified conical in shape operably coupled to a storage compartment 5. The storage compartment 5 is generally modified oval in shape being substantially hollow and is fluidly connected to the tube 10 proximate the first end 11 of the tube 10. The tube 10 is generally cylindrical in shape and extends upward from the storage compartment 5. A top 15 is releasably secured proximate the second end 12 of the tube 10. The top 15 further includes a ring 20 operable to suspend the bird feeder 100 from a suitable support structure.

The base 2 is constructed from a suitable durable material such as but not limited to plastic. The base 2 is generally modified conical in shape having an upper portion 3 that is at least narrower in diameter than the lower portion 4. The base 2 is substantially hollow having an interior volume and functions to store a fluid substance such as but not limited to nectar for birds. While the base 2 has been illustrated herein as being typically conical in shape, it is contemplated within the scope of the present invention that the base 2 could be manufactured in numerous different shapes and still achieve the desired function as described herein. The base 2 further includes a plurality of apertures 7. The apertures 7 are journaled through the wall 1 of the base 2 using suitable techniques. The apertures 7 function to provide access to the interior volume of the base 2 so as to allow withdrawal of the contents disposed therein by a bird. A membrane 14 is mounted adjacent to the aperture 7. The membrane 14 is a generally elastic and collapsible material that functions to cover the aperture 7 and provide access to the aperture 7 for animals such as birds with beaks wherein the beak of the bird can penetrate the membrane 14 and the bird can access the interior volume of the base 2 so as to access the liquid phase food stored therein. While it is contemplated within the scope of the present invention that four apertures 7 are journaled through the wall 1 of the base, those skilled in the art will recognize that the base 2 could have numerous different amounts of apertures 7.

Extending outward from the base 2 are a plurality of support members 77. The support members 77 are secured to the base 2 utilizing suitable durable chemical or mechanical methods. The support members 77 are manufactured from a suitable durable material such as but not limited to plastic or metal. The support members 77 are generally arcuate in shape and function to provide support for a bird while accessing the apertures 7. Those skilled in the art will recognize that the support members 77 could be formed in numerous different shapes and perform the desired function as described herein.

Hermetically sealed to the upper portion 3 of the base 2 is the storage compartment 5. The storage compartment 5 is generally modified oval in shape having an interior volume configured to store a fluid therein. The storage compartment 5 is fluidly connected to the base 2 such that as birds withdraw the fluid present in the base via the aperture 7, any fluid that is present in the storage compartment 5 will transfer to the interior volume of the base by gravitational force. While the storage compartment 5 is illustrated in the preferred embodiment herein as being generally modified oval in shape, it is contemplated within the scope of the present invention that the storage compartment 5 could be formed in numerous different shapes and still achieve the desired function as described herein. Additionally, while the storage compartment 5 in its preferred embodiment has a wall 6 that is generally translucent, it is contemplated within the scope of the present invention that the wall 6 could be non-translucent.

Fluidly sealed to the upper end 19 of the storage compartment 5 is the tube 10. The tube 10 is hermetically sealed to the upper end 19 of the storage compartment 5 and functions to transfer fluid into the storage compartment 5. The tube 10 is generally cylindrical in shape having a passage 21 operable to transfer fluid through the tube 10 into the storage compartment 5. The passage 21 is accessed via the opening 22. The tube 10 is manufactured from a suitable durable material such as but not limited to plastic. Releasably secured to the tube 10 opposite the storage compartment 5 is the top 15. The top 15 is operably coupled to the tube 10 utilizing suitable durable means such as but not limited to threads. The top 15 is removable to allow access to the opening 22 in order to allow a user to deposit fluid therethrough. This allows a user to fill the base 2 and storage compartment 5 while maintaining the bird feeder 100 in a substantially vertical position. The top 15 is modified conical in shape and is manufactured from a suitable durable material such as but not limited to plastic. Those skilled in the art will recognize that the top 15 could be formed in numerous different shapes and still achieve the desired function as described herein. A ring 30 is operably coupled to the top 15 utilizing suitable durable means. The ring 30 is generally annular in shape having an opening 31 operable to receive therein a suitable support structure to suspend the bird feeder 100 therefrom. The ring 30 is manufactured from a suitable durable material such as but not limited to metal or plastic.

A cover 40 is releasably secured proximate the second end 12 of the tube 10. The cover 40 is generally half-dome shaped and functions to shield the lower portion of the bird feeder 100 from environmental elements such as but not limited to precipitation or sun. The cover 40 extends beyond the perimeter of the containers 65. The cover 40 is configured such that it is placed proximate the second end 12 of the tube 10 during removal of the top 15. The cover 40 is held in place proximate the second end 12 of the tube 10 utilizing suitable conventional methods such as but not limited to a retaining ring. The top 15 is releasably secured to the tube 10 superposed the cover 40 in order to releasably secure the cover 40 such that the bottom edge 41 of the cover is oriented in a substantially horizontal manner. While the cover 40 is illustrated herein as being generally half-dome shaped, it is contemplated within the scope of the present invention that the cover 40 could be shaped in numerous different manners and still achieve the desired functionality as described herein.

Figure 2:
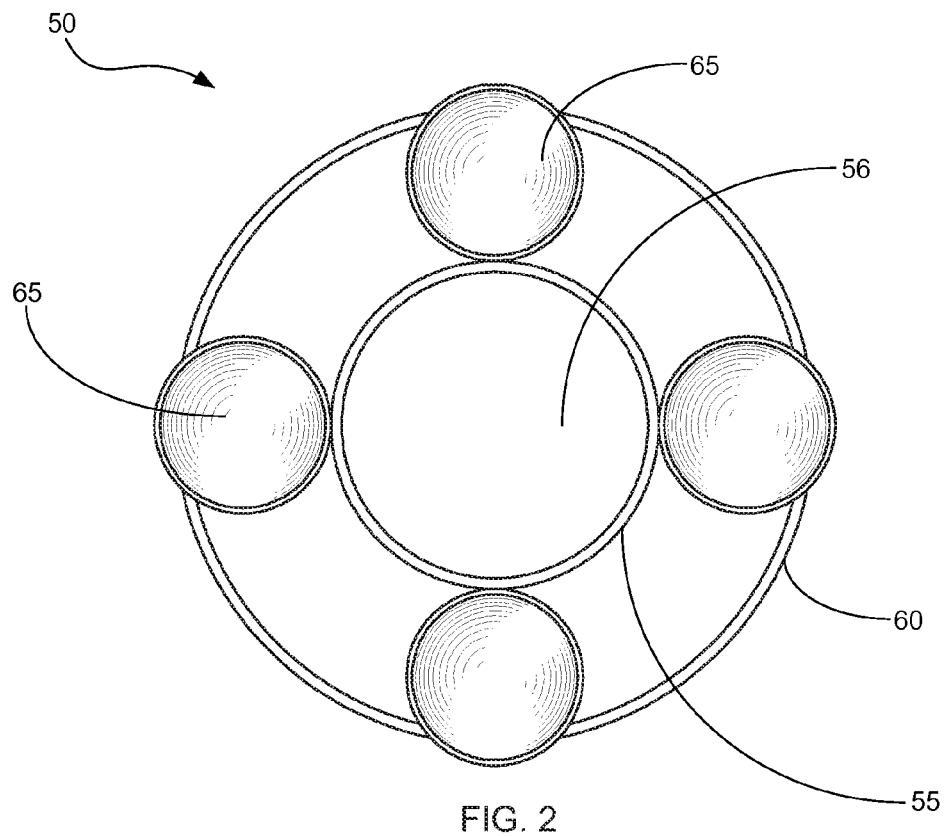
FIG. 2 is a top view of the gelatinous phase dispenser of the present invention.
Figure 3:
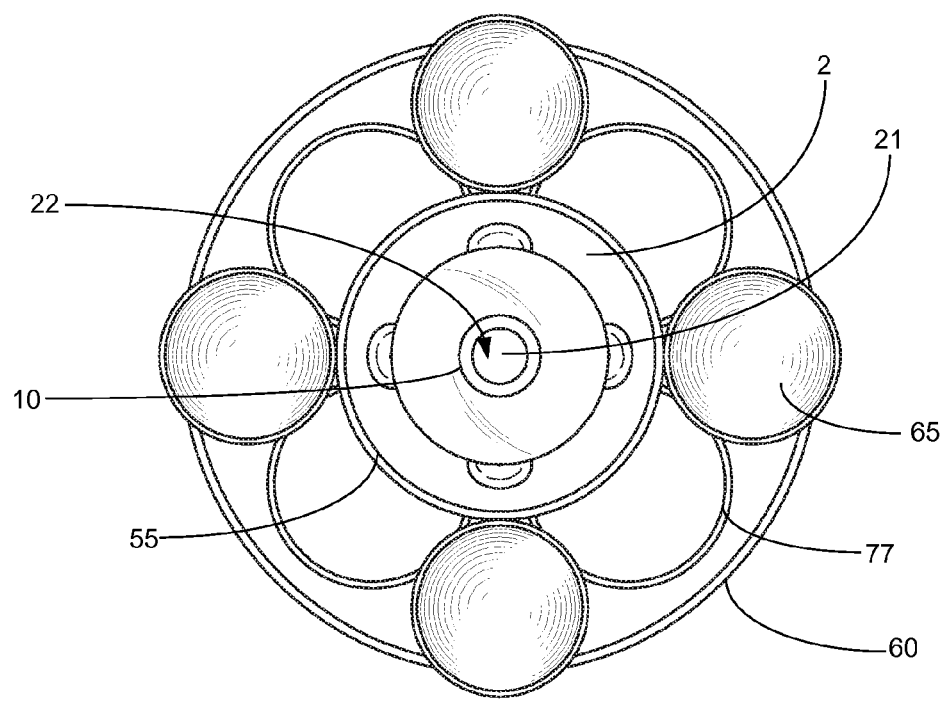
FIG. 3 is a top view of the embodiment of the present invention.

As shown in particular in FIG. 2, the bird feeder 100 further includes a gelatinous food storage unit 50. The gelatinous food storage unit 50 functions to provide store and provide access to birds a second phase of food that is generally gelatinous in phase. The gelatinous food storage unit 50 further includes an inner support ring 55 and an outer support ring 60 having a plurality of containers 65 intermediate thereto. The inner support ring 55 is generally annular in shape and is constructed of a rigid suitable material such as but not limited to metal. The inner support ring 55 has an opening 56 that functions to releasably secure to the base 2. The inner support ring 55 is superposed the lower portion 4 of the base 2 and is frictionally engaged therewith so as to maintain its position. While no specific diameter of the inner support ring 55 is required, good results have been achieved utilizing an inner support ring 55 that has an opening 56 that is approximately seven inches in diameter. It is further contemplated within the scope of the present invention that the diameter of the opening 56 is constructed to correspond to the diameter of the lower portion 4 of the base 2 such that the diameter of the opening is at least slightly smaller than the diameter of the lower portion 4 of the base 2 so as to frictionally engage therewith as desired within the scope of the present invention. It is further contemplated within the scope of the present invention that the inner support ring 55 could be fastened to the base 2 utilizing a plurality of conventional fasteners.

The gelatinous food storage unit 50 further includes the outer support ring 60. The outer support ring 60 is generally annular in shape and is manufactured from a suitable durable material such as but not limited to plastic or metal. The outer support ring 60 in conjunction with the inner support ring 55 function to provide structural support for containers 65. While no specific diameter of the outer support ring 60 is required, good results have been achieved utilizing an outer support ring 60 that is approximately thirteen inches in diameter.

The containers 65 are secured intermediate the inner support ring 55 and outer support ring 60. The containers 65 are generally bowl shaped having an interior volume 66 configured to receive and retain a gelatinous food substance. While no specific gelatinous food substance is preferred, it is contemplated within the scope of the present invention that the containers 65 are filled with jelly wherein the jelly can be accessed by birds for consumption. The containers 65 are manufactured from a suitable durable material such as but not limited to plastic. The containers 65 are secured to the inner support ring 55 and outer support ring 60 utilizing conventional mechanical or chemical methods. While no specific size of the containers 65 is required good results have been achieved utilizing containers 65 that are approximately three inches in width. While in the illustrations submitted herewith the preferred embodiment includes four containers 65, it is contemplated within the scope of the present invention that the bird feeder 100 could be configured with as few as one container 65.

Referring in particular to FIG. 1, a description of the operation of the bird feeder 100 is as follows. In use, a user will remove the top 15 from the second end 12 of the tube 10 in order to access the opening 22 of the passage 21. The user will dispense a desired fluid into the tube 10 via the opening 22 wherein the fluid will travel through the passage 21 and into the storage compartment 5 and subsequently the base 2. As the fluid fills the interior volume of the base 2 the fluid subsequently fills the storage compartment 5. The user dispenses the desired amount of fluid into the bird feeder 100. The user replaces the top 15 ensuring that the cover has been superposed the second end 12 of the tube 10 and is in the desired position. Following the dispensing of fluid into at least the base 2, the user will at least partially fill the containers 65 with the desired gelatinous food substance such as apple or grape jelly. Ensuing the deposit of the desired gelatinous food into the containers 65, the bird feeder 100 is suspended on a suitable support structure utilizing the ring 30. As required, the user will refill the base 2 or the containers 65 with the liquid phase and gelatinous phase food respectively.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A bird feeder comprising:
a body, said body having an upper end and a lower end, said body including at least one storage compartment, said at least one storage compartment being substantially hollow having an interior volume, said at least one storage compartment configured to provide at least one phase of food to a bird, said storage compartment including at least one aperture for accessing the interior volume thereof; and
a gelatinous phase food storage assembly, said gelatinous phase food storage assembly coupled to said body, said gelatinous phase food storage assembly further including at least one container, said at least one container of said gelatinous phase food storage assembly being generally bowl shaped, said at least one container being coupled to said body proximate the lower end of said body, said gelatinous phase food storage assembly configured to store and subsequently provide a gelatinous phase food to at least one bird;
a cover, said cover operably coupled with said body, said cover operable to substantially protect the gelatinous phase food storage assembly from environmental conditions;
an outer support ring, said outer support ring configured to engage said at least one container, said outer support ring configured to support said at least one container;
an inner support ring, said inner support ring coupled to said at least one container, said inner support ring operable to releasably secure said gelatinous food storage assembly to said body;
a tube, said tube fluidly connected to said storage compartment, said tube being intermediate said cover and said body, said tube having a first end and a second end, said first end being configured with an opening, said opening of said first end providing access to transfer fluid into said storage compartment; and
wherein said inner support ring is approximately seven inches in diameter and said outer support ring is approximately thirteen inches in diameter.

2. A bird feeder configured to provide a plurality of birds at least two phases of bird food comprising:
a body, said body having a first storage compartment and a second storage compartment, said first storage compartment being generally hollow having an interior volume conical in shape, said second storage compartment being generally hollow and modified oval in shape, said first storage compartment and said second storage being operably connected, said first storage compartment having a plurality of apertures, said plurality of apertures configured to provide access to the interior volume of said first storage compartment, said body operable to provide a liquid phase food to a plurality of birds; and
a gelatinous food assembly, said gelatinous food assembly being coupled to said body, said gelatinous food assembly mounted proximate said first storage compartment, said gelatinous food assembly having a plurality of containers, said gelatinous food assembly configured to provide a gelatinous phase food to a plurality of birds.

3. The bird feeder as recited in claim 2, wherein said gelatinous food assembly further includes an inner support ring and an outer support ring, said inner support ring configured to releasably secure said gelatinous food assembly to said first storage compartment, said inner support ring coupled with said plurality of containers wherein said inner support ring engages the portion of each of said plurality of containers that is proximate said first storage compartment, said outer support ring secured to each of said plurality of containers, said outer support ring engaging the portion of each of said plurality of containers distal to said first storage compartment.

4. The bird feeder as recited in claim 3, and further including a tube, said tube being operably coupled to said second storage compartment, said tube having a first end and a second end, said tube further including a passage configured to allow fluid flow therethrough.

5. The bird feeder as recited in claim 4, and further including a cover, said cover operably coupled to said tube proximate said first end, said cover being generally half-dome shaped, said cover operable to extend beyond the perimeter of said plurality of containers.

6. The bird feeder as recited in claim 5, and further including a top, said top releasably secured to said first end of said tube and superposed said cover, said top having a first position and a second position, said top in said second position configured to provide access to said passage to allow fluid to be transferred into said tube.

7. The bird feeder as recited in claim 6, wherein said plurality of containers are bowl shaped, said plurality of containers being intermediate said inner support ring and said outer support ring, said plurality of containers having an interior volume, said plurality of containers configured to store and subsequently provide access to a gelatinous phase food substance.

8. The bird feeder as recited in claim 7, wherein the gelatinous phase food substance is jelly.

9. A bird feeder configured to provide a plurality of birds a first phase food and a second phase food comprising:
   a first storage compartment, said first storage compartment being generally conical in shape, said first storage compartment having a lower portion and an upper portion, said first storage compartment being generally hollow having an interior volume configured to store the first phase food therein, said first storage compartment having a plurality of apertures, said plurality of apertures configured to provide access to the interior volume of said first storage compartment, said plurality of apertures further including a collapsible membrane, said membrane disposed substantially across said plurality of apertures;
   a second storage compartment, said second storage compartment fluidly connected to said first storage compartment, said second storage compartment operably coupled to said upper portion of said first storage compartment, said second storage compartment being above said first storage compartment, said second storage compartment being generally modified oval in shape, said second storage compartment operable to store the first phase food therein; and
   a second phase food assembly, said second phase food assembly being proximate said first storage compartment, said second phase food assembly including four containers, said four containers being substantially bowl shaped, said four containers operable to store and permit access to a second phase of food, said four containers circumferentially dispersed proximate said lower portion of said first storage compartment.

10. The bird feeder as recited in claim 9, and further including a tube, said tube being operably coupled to said second storage compartment distal from said first storage compartment, said tube having a first end and a second end, said tube further including a passage configured to allow fluid flow therethrough.

11. The bird feeder as recited in claim 10, and further including a cover, said cover operably coupled to said tube proximate said first end, said cover being generally half-dome shaped, said cover operable to extend beyond the perimeter of said second phase food assembly.

12. The bird feeder as recited in claim 11, wherein said second phase food assembly further includes an inner support ring and an outer support ring, said inner support ring configured to releasably secure said second phase food assembly to said first storage compartment, said inner support ring coupled with said four containers wherein said inner support ring engages the portion of each of said four containers that is proximate said first storage compartment, said outer support ring secured to each of said four containers, said outer support ring engaging the portion of each of said four containers distal to said first storage compartment.

13. The bird feeder as recited in claim 12, wherein the first phase of food provided by the bird feeder is a liquid phase food.

14. The bird feeder as recited in claim 13, wherein the second phase of food provided by the bird feeder is the gelatinous phase food of jelly.

\* \* \* \* \*